United States Patent
Kaufmann et al.

(10) Patent No.: US 10,260,429 B2
(45) Date of Patent: Apr. 16, 2019

(54) APPARATUS FOR THE ACTUATION OF A THROTTLE VALVE, IN PARTICULAR A THROTTLE VALVE OF AN INTAKE SYSTEM OF AN INTERNAL COMBUSTION ENGINE

(71) Applicant: MAN Truck & Bus AG, Munich (DE)

(72) Inventors: Torsten Kaufmann, Lauf (DE); Mathias Boegershausen, Erlangen (DE)

(73) Assignee: MAN TRUCK & BUS AG, Munich (DE)

( * ) Notice: Subject to any disclaimer, the term of this patent is extended or adjusted under 35 U.S.C. 154(b) by 448 days.

(21) Appl. No.: 14/485,015

(22) Filed: Sep. 12, 2014

(65) Prior Publication Data
US 2015/0075161 A1 Mar. 19, 2015

(30) Foreign Application Priority Data
Sep. 13, 2013 (DE) .......................... 10 2013 015 138

(51) Int. Cl.
| | |
|---|---|
| F02D 9/08 | (2006.01) |
| F02D 9/02 | (2006.01) |
| F02D 9/10 | (2006.01) |
| F02D 23/00 | (2006.01) |
| F16D 1/04 | (2006.01) |

(Continued)

(52) U.S. Cl.
CPC .................. F02D 9/08 (2013.01); F02D 9/02 (2013.01); F02D 9/107 (2013.01); F02D 9/1065 (2013.01); F02D 23/00 (2013.01); F16D 1/04 (2013.01); F16D 1/0864 (2013.01); F16D 3/06 (2013.01); F16K 1/221 (2013.01); F16K 31/041 (2013.01);
(Continued)

(58) Field of Classification Search
CPC .......... F02D 9/107; F02D 9/1065; F02D 9/16; F02D 9/1075; F02D 9/108; F02D 9/1085; F16D 1/04; F16D 1/05; F16D 1/06; Y10T 403/21; Y10T 403/213; Y10T 403/217
USPC ................. 251/304, 305, 292; 417/359–361; 60/605.1
See application file for complete search history.

(56) References Cited

U.S. PATENT DOCUMENTS 1,117,605 A * 11/1914 Schantz ................ F04D 29/044
415/119
2,198,455 A * 4/1940 Mueller .................. F16K 31/44
126/116 B (Continued)

FOREIGN PATENT DOCUMENTS

| DE | 10344218 A1 | 4/2005 |
|---|---|---|
| DE | 10201107088 A1 | 1/2013 |

(Continued)

OTHER PUBLICATIONS

Engineering Toolbox—Thermal Conductivity.*

*Primary Examiner* — Jason Shanske
*Assistant Examiner* — Jessica Kebea
(74) *Attorney, Agent, or Firm* — Lucas & Mercanti, LLP

(57) ABSTRACT

An apparatus for the actuation of a throttle valve, in particular a throttle valve arranged in an intake system of an internal combustion engine, uses a servomotor, in which apparatus at least one device for thermal decoupling is arranged between the throttle valve and servomotor. A shaft of the servomotor is coupled to a shaft of the throttle valve via a torque-transmitting coupling element with a definedly low heat transfer capability.

17 Claims, 3 Drawing Sheets

(51) Int. Cl.
  *F16D 1/08* (2006.01)
  *F16D 3/06* (2006.01)
  *F16K 1/22* (2006.01)
  *F16K 31/04* (2006.01)
  *F16D 3/205* (2006.01)

(52) U.S. Cl.
  CPC ............ *F02D 9/108* (2013.01); *F02D 9/1085* (2013.01); *F16D 3/2052* (2013.01)

(56) References Cited

U.S. PATENT DOCUMENTS

| | | | | | |
|---|---|---|---|---|---|
| 3,324,798 | A | * | 6/1967 | Freed | F04D 29/042 415/131 |
| 3,507,129 | A | * | 4/1970 | Tarenskeen | B21B 19/02 403/306 |
| 3,509,391 | A | * | 4/1970 | Pfeuffer | B65G 27/08 209/368 |
| 4,044,631 | A | * | 8/1977 | Matousek | F15B 15/065 74/606 R |
| 4,260,125 | A | * | 4/1981 | Levine | H02K 5/26 248/675 |
| 4,380,246 | A | * | 4/1983 | Casale | F16K 1/22 137/340 |
| 4,454,970 | A | * | 6/1984 | Krauser | B62J 11/00 224/413 |
| 4,549,446 | A | * | 10/1985 | Beeson | F16K 31/04 137/270 |
| 4,633,897 | A | * | 1/1987 | Effenberger | F16K 27/00 137/315.35 |
| 4,697,615 | A | * | 10/1987 | Tsuchimoto | F16K 27/0218 137/15.25 |
| 4,705,063 | A | * | 11/1987 | Robinson | F16K 5/08 137/315.03 |
| 4,778,349 | A | * | 10/1988 | Browning | F04B 9/02 403/299 |
| 5,056,950 | A | * | 10/1991 | Rateick, Jr. | F16B 7/042 403/24 |
| 5,275,373 | A | | 1/1994 | Kalippke | |
| 5,505,661 | A | * | 4/1996 | Habicht | F16D 3/16 464/114 |
| 5,655,849 | A | * | 8/1997 | McEwen | F04D 13/021 403/370 |
| 5,680,880 | A | * | 10/1997 | Miyake | F16K 31/04 137/338 |
| 6,079,210 | A | * | 6/2000 | Pintauro | F02B 37/183 123/568.21 |
| 6,279,870 | B1 | * | 8/2001 | Welz, Jr. | F16K 27/0218 251/129.04 |
| 6,574,961 | B2 | * | 6/2003 | Shiraishi | F01N 3/28 60/602 |
| 6,682,432 | B1 | * | 1/2004 | Shinozuka | F16B 2/065 403/222 |
| 6,716,104 | B2 | * | 4/2004 | MacDonald | F16D 3/76 403/344 |
| 6,742,765 | B2 | * | 6/2004 | Takano | F16K 31/047 251/292 |
| 7,614,855 | B2 | * | 11/2009 | Cook | F04B 9/04 264/674 |
| 8,051,842 | B2 | * | 11/2011 | Hagelstein | F02B 29/0437 123/563 |
| 8,480,054 | B2 | * | 7/2013 | Pintauro | F02B 37/183 251/129.11 |
| 8,931,759 | B2 | | 1/2015 | Bonanno | |
| 2003/0056836 | A1 | * | 3/2003 | Gagnon | F16K 1/221 137/554 |
| 2006/0124171 | A1 | * | 6/2006 | Ghazarian | F17D 5/06 137/312 |
| 2007/0176068 | A1 | * | 8/2007 | Kuo-Chen | F16K 27/067 248/300 |
| 2008/0017816 | A1 | * | 1/2008 | Willats | F02D 9/04 251/77 |
| 2010/0095670 | A1 | * | 4/2010 | Grzonkowski | F02B 37/12 60/602 |

FOREIGN PATENT DOCUMENTS

| | | |
|---|---|---|
| RU | 2092706 C1 | 10/1997 |
| WO | 2008014044 A1 | 1/2008 |
| WO | 2009148694 A1 | 12/2009 |
| WO | 2012084796 A1 | 6/2012 |

* cited by examiner

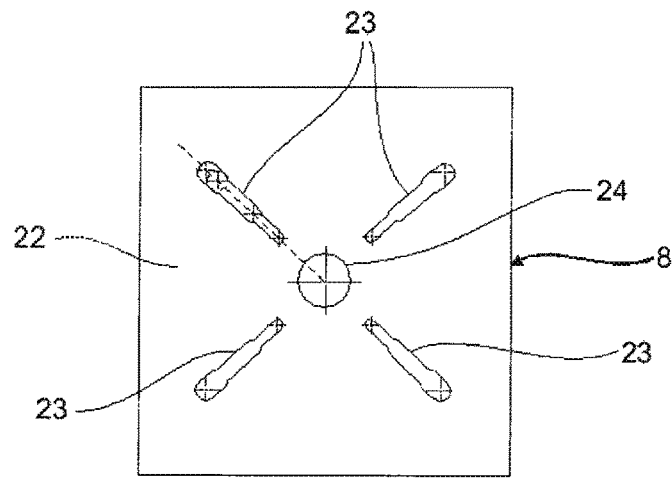
Fig. 5
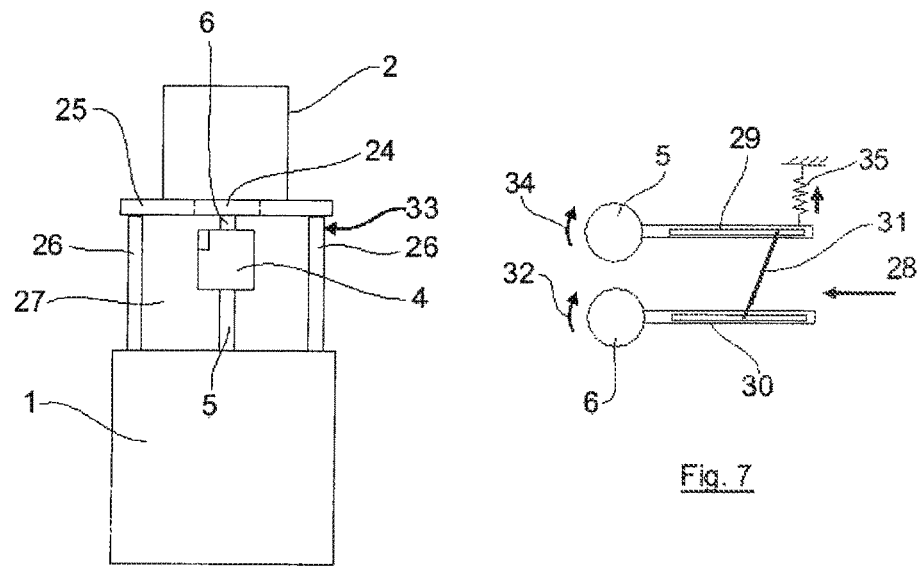
Fig. 6a
Fig. 7
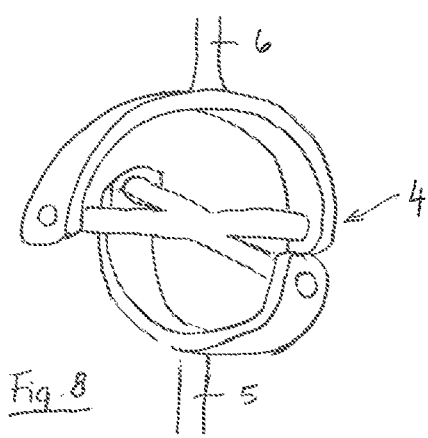
Fig. 8

APPARATUS FOR THE ACTUATION OF A THROTTLE VALVE, IN PARTICULAR A THROTTLE VALVE OF AN INTAKE SYSTEM OF AN INTERNAL COMBUSTION ENGINE

CROSS-REFERENCE TO RELATED APPLICATIONS

This application claims the priority of DE 10 2013 015 138.4 filed Sep. 13, 2013, which is incorporated by reference herein.

BACKGROUND OF THE INVENTION

The invention relates to a device for the actuation of a throttle valve, in particular a throttle valve of an intake system of an internal combustion engine, by means of a servomotor and to an internal combustion engine having the device for the actuation of the throttle valve.

For the actuation of throttle valves of internal combustion engines, conventional devices use servomotors which are coupled in torque-transmitting fashion to the shaft of the respective throttle valve. A problem here is that the medium stream that is controlled by the throttle valve is at a high temperature in the case of supercharged engines or internal combustion engines, whereas conventional servomotors however tolerate only low levels of thermal heating. The use of servomotors that can withstand high thermal loads would be one conceivable measure to solve said problem. Special servomotors with very high thermal load capability would however be very cumbersome and would thus also entail correspondingly high cost outlay.

To be able to use conventional servomotors to actuate throttle valves that are used to control a medium stream at very high temperature, it would be possible to implement measures for realizing thermal decoupling between the throttle valve and servomotor. DE 103 44 218 A1 discloses thermal decoupling between a servomotor and a valve. For this purpose, use is made of a coupling element in the form of a rocker arm, which coupling element is composed of a material which exhibits poor thermal conductivity. Such a rocker arm is however not suitable for transmitting torque between the shaft of a servomotor and the shaft of a throttle valve.

BRIEF SUMMARY OF THE INVENTION

An object of the present invention is to provide an apparatus for the actuation of a throttle using a servomotor, in which apparatus a torque-transmitting device for thermal decoupling acts between the throttle valve and the servomotor. A further object of the present invention is to provide an internal combustion engine having the apparatus for the actuation of a throttle valve.

The object is met by an apparatus for the actuation of a throttle valve using a servomotor, in which apparatus at least one device for thermal decoupling is arranged between the throttle valve and servomotor. According to an embodiment of the invention, the shaft of the servomotor is coupled to the shaft of the throttle valve via a torque-transmitting coupling element with a definedly low heat transfer capability. The lower the heat transfer capability of the coupling element, the smaller the spacing between the servomotor and the throttle valve can be, which yields a considerable space saving.

The indirect coupling of the shaft of the servomotor to the shaft of the throttle valve via a torque-transmitting coupling element with a definedly low heat transfer capability may be realized in a variety of ways. This may for example be realized by virtue of the coupling element having a lower heat transfer capability than the shaft of the servomotor, and/or the coupling element having a lower heat transfer capability than the shaft of the throttle valve. It is also alternatively or additionally possible for the coupling element itself to be manufactured at least in regions, in particular at least at the contact points with respect to at least one of the shafts, from a material with a low heat transfer capability. It is alternatively or additionally possible for the coupling of the coupling element to the shaft of the servomotor and/or to the shaft of the throttle valve to be geometrically configured such that only definedly low heat transfer takes place between the coupled components, this being realized for example by way of punctiform or linear contact rather than areal abutment. The expression "coupling element with a definedly low heat transfer capability" should thus be interpreted and understood not only in a restrictive sense, for example with regard to the material selection, but expressly in a broad sense which for example also includes design configurations with low heat transfer capability. Furthermore, the expression "low heat transfer capability" should also be understood in a broad sense and, where technically possible, self-evidently encompasses embodiments in which no heat transfer takes place.

The heat transfer capability of the coupling element may be realized by corresponding material selection and/or by a corresponding geometric configuration of the coupling element. It is preferable for the coupling element to be in the form of a sleeve into which the shaft of the throttle valve engages in a positively locking manner in such a way that the shaft of the throttle valve may deviate in terms of angle from the axial orientation of the shaft of the servomotor, as is the case for example with a cardan joint. Assembly is facilitated by said measure because the two shafts of throttle valve and servomotor do not need to be in exact axial alignment.

For the thermal decoupling between the throttle valve and servomotor, it may be provided that the servomotor is fastened to a holder, in particular to a holder which is open at least on one side, so as to be spaced apart from the throttle valve. The coupling element is then preferably situated in the region of the open holder. The holder is particularly preferably open on three sides, such that the coupling element situated therein can dissipate heat to the ambient air in an optimum manner. It is also possible for the holder itself, by its open configuration, to dissipate heat to the ambient air in an optimum manner, such that overall, there is the least possible heat transfer from the housing and the shaft of the throttle valve to the servomotor.

In a particularly preferred embodiment, the holder is composed of two holding brackets which are screwed together and which together form a substantially U-shaped motor support. One of the two legs of the U-shaped motor support is fixed to the housing of the throttle valve, whereas the other leg is connected, in particular screwed, to the servomotor. The spacing of the two legs is preferably adjustable in order to permit easy adaptation to different installation situations. A holder composed of two holding brackets is not only very simple and thus inexpensive to produce but also has three open sides, which permits an optimum dissipation of heat in the intermediate space between throttle valve and servomotor.

In an alternative embodiment in this regard, the holder has a holding element, in particular a support plate as a holding element, to which the servomotor is fixed and which is connected, in particular screwed by multiple fastening screws, to the housing of the throttle valve via at least one spacer sleeve, such that the holding element or a support plate that forms the holding element is situated spaced apart from the housing of the throttle valve, and heat conduction can take place to a small extent only via the spacer sleeves and/or the screws, but overall, an open receiving space for the clamping element is generated which ensures particularly good dissipation of heat from the clamping element to the ambient air. What is particularly preferable in this connection is an embodiment in which the holding element is formed by a rectangular support plate, in each of the corners of which the spacer sleeves are arranged. Such a construction with multiple spacer sleeves arranged in the corner regions is altogether relatively stable, in particular also with regard to the natural frequencies arising in this region It is also particularly advantageous for that element of the holder which faces toward the servomotor (said element being for example a leg of a holding bracket or a holding or support plate) to be provided with fastening slots that are suitable for the fastening of servomotors with connection flanges of different sizes. In this way, it is possible to use one embodiment of a holder for different motor sizes.

The coupling element that is inserted between the two shafts of throttle valve and servomotor may, in order to provide a definedly low heat transfer capability, be composed at least in regions or partially of ceramic and/or plastic or any other material with a definedly low heat transfer capability.

Definedly low heat transfer between the two shafts may furthermore also be achieved by virtue of the torque-transmitting coupling being realized via linear or punctiform contact surfaces in the region of the coupling element. By means of such small contact surfaces, only very low heat transfer is possible in the materials that are in contact.

It is also achieved in the case of an embodiment of the coupling element as a cardan joint that relatively small contact surfaces are required within the coupling element in order to realize a transmission of torque between the two shafts.

If, according to one advantageous refinement of the invention, the coupling element is in the form of a linkage that acts between the two shafts, a transmission of heat between the two shafts can be considerably reduced in relation to a direct coupling simply owing to the linkage length and the associated radiation of heat to the environment.

If the coupling element is a sleeve, this can particularly advantageously be connected in positively locking fashion to the shaft of the servomotor or to the shaft of the throttle valve, whereas the other end of the sleeve is connected in non-positively locking fashion to the respective other shaft. In the preferred embodiment, the sleeve is connected in non-positively locking fashion to the shaft of the servomotor by means of a clamping connection. The positively locking connection to the shaft of the throttle valve is then preferably configured such that a transmission of torque is possible via the positively locking connection, and the coupling element can be pulled off the shaft of the throttle valve in an axial direction. In this way, the servomotor can be pulled off the shaft of the throttle valve, and mounted on the latter again, together with the coupling element, which results in correspondingly low assembly outlay.

The sleeve preferably has a slotted and thus radially movable clamping region which can be fixedly clamped to an inserted shaft, and also released again, by means of a clamping screw.

The coupling element in the form of a sleeve preferably has, on the side at which it is connected in positively locking fashion to one of the two shafts, a receiving opening for the respective shaft, wherein the receiving opening has a considerably larger diameter than the shaft inserted therein. This yields a corresponding assembly tolerance, such that the shaft that engages in positively locking fashion into the sleeve does not need to be aligned exactly, with regard to its angle of orientation, relative to the respective other shaft. The positively locking connection may in this case be realized in a very simple manner by means of a transverse pin provided on the corresponding shaft, and a corresponding longitudinal slot on the sleeve. The transverse pin preferably engages into opposite longitudinal slots or into opposite longitudinal grooves on the sleeve.

In order that the servomotor together with a coupling element mounted on the shaft thereof can be pulled off the shaft of the throttle valve without problems, it is possible for a corresponding passage opening for the shaft of the servomotor to be provided on the holder that supports the servomotor, the opening diameter of which passage opening is dimensioned such that the coupling element can be guided through the passage opening.

The apparatus according to the invention is preferably used in internal combustion engines that are used in motor vehicles, for example in utility vehicles, or as static engines, and here, preferably in the region of the intake system. The internal combustion engines may be not only conventional fuel-fired internal combustion engines but also gas-fired engines or similar engines.

What is particularly preferable here is the use of the throttle valve together with the apparatus according to the invention in an assembly in which the throttle valve is arranged downstream of a compressor of an exhaust-gas turbocharger of the internal combustion engine and upstream of a charge-air cooler of the intake system, and thus between a compressor and the charge-air cooler, because in the case of such an arrangement, very high temperatures, for example temperatures of over 200° C., can arise downstream of the compression process.

BRIEF DESCRIPTION OF THE DRAWINGS

The invention will be explained in more detail below on the basis of exemplary embodiments illustrated in the drawing, in which:

FIG. 5 shows the plan view of a leg of a U-shaped motor support for the fastening of a servomotor, FIG. 6a shows a device for actuating a throttle valve, in which device the holder for the servomotor is fastened via spacer sleeves to the housing of the throttle valve, FIG. 7 shows the principle of a coupling between servomotor and throttle valve by means of a linkage.

FIG. 8 shows an embodiment of the apparatus for actuating a throttle valve in the form of a cardan joint.

DETAILED DESCRIPTION OF THE PREFERRED EMBODIMENTS

Figures 1, 2:
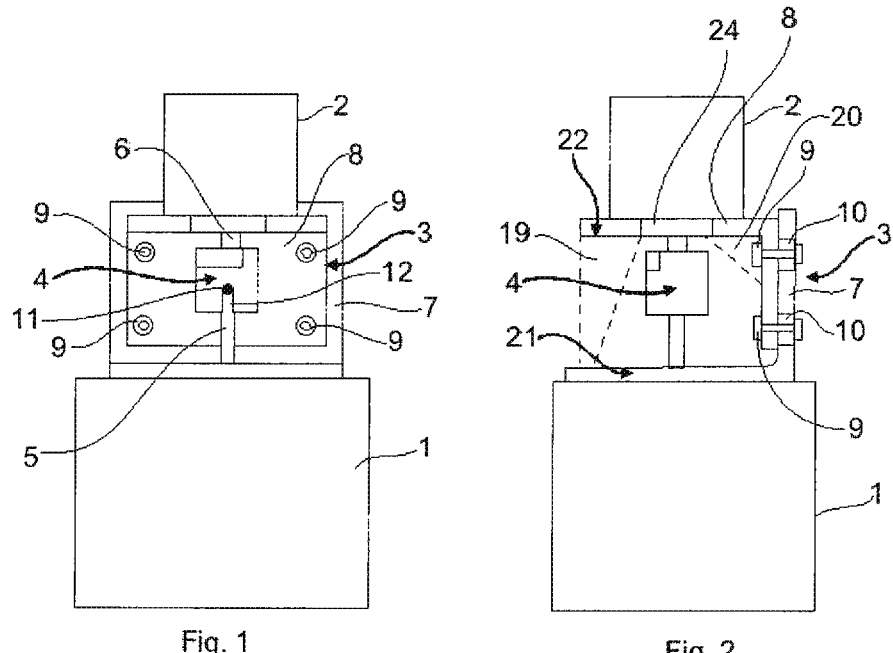
FIG. 1 is a simplified illustration of an apparatus for actuating a throttle valve.
FIG. 2 shows a view of the apparatus in FIG. 1, but rotated through 90° in relation to FIG. 1.

FIG. 1 shows, in simplified form, a throttle valve 1 which is illustrated as a functional block, a servomotor 2, a holder 3, and a coupling element 4 which couples the two shafts 5, 6 of the throttle valve 1 and of the servomotor 2 in torque-transmitting fashion.

The holder 3 is of substantially U-shaped form and is composed of two holding brackets 7, 8 which are screwed to one another by means of screws 9. In the view, rotated through 90°, of FIG. 2, it can be seen that the holding bracket 7 has vertically oriented slots 10, whereby the holding bracket 8 can be adjusted in terms of height relative to the holding bracket 7.

In FIG. 1 and FIG. 2, for the coupling of the two shafts 5, 6, there is provided a coupling element 4 which is in the form of a sleeve and which is fixedly screwed or fixedly clamped to the shaft 6 of the servomotor 2. By contrast, the shaft 5 engages by way of a transverse pin 11 into a longitudinal slot 12 of the clamping element 4. The transverse pin 11 thus forms, in conjunction with the longitudinal slot 12, a positively locking connection by means of which a torque can be transmitted from the coupling element 4 to the shaft 5 of the throttle valve 1.

Figure 3:
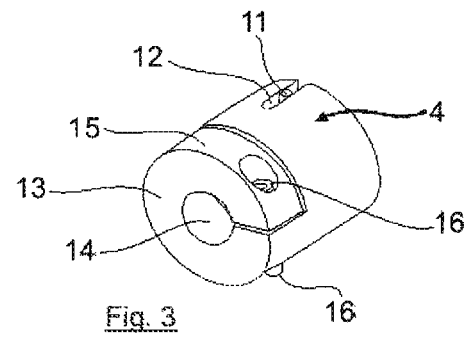
FIG. 3 shows a perspective view of a coupling element such as is used in the apparatus of FIG. 1 and FIG. 2.
Figure 4:
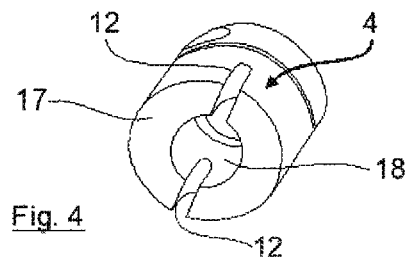
FIG. 4 shows the rear view of the coupling element from FIG. 3.

The coupling element 4 is illustrated in more detail in FIG. 3 and FIG. 4, wherein the transverse pin 11, which engages into the longitudinal slot 12, of the shaft is also indicated in FIG. 3. On the side 13 facing toward the shaft 6 of the servo motor 2, the clamping element 4 has a receiving opening 14 which is matched in terms of diameter to the shaft 6. A slotted clamping region 15 of the clamping element 4 can be clamped by means of a clamping screw 16 to the shaft 6, which is inserted into the receiving opening 14, of the servo motor 2 (FIG. 1) in order to produce a non-positively locking connection between the clamping element 4 and the shaft 6.

In the view of FIG. 4, that side 17 of the clamping element 4 which faces toward the shaft 5 of the throttle valve 1 can be seen in the foreground. The clamping element 4 which is in the form of a sleeve has opposite longitudinal slots 12 into which the shaft 5 of the throttle valve 1 can engage in positively locking fashion by way of transverse pins 11 (FIG. 1) that project from both sides of the shaft. To receive the shaft 5 of the throttle valve 1, the clamping element 4 has a receiving opening 18 which has a considerably larger diameter than the diameter of the shaft 5 to be inserted. It is achieved in this way that, for the shaft 5 of the throttle valve 1, not only is an axial assembly tolerance admissible owing to the longitudinal slots 12, but a small angular deviation relative to the orientation of the shaft 6 of the servomotor 2 is also possible.

The coupling element 4 may be manufactured from a material which has definedly low thermal conductivity. The coupling element 4 may however also be composed of a material of low thermal conductivity only partially, for example in the clamping region of the receiving bore 14 (FIG. 3). As a material with low thermal conductivity, use may for example be made of ceramic or plastic.

To realize low heat transfer between the high-temperature region of the throttle valve and the temperature-sensitive servomotor, there is provided, as per FIG. 1 and FIG. 2, a U-shaped holder 3 which is open on three sides. In this way, the coupling element 4 situated therein can dissipate heat to the ambient air. Furthermore, the U-shaped holder itself also assists in achieving that as little heat as possible is transmitted between the throttle valve 1 and the servomotor 2 via the material of the holder. The open design of the holder 3 specifically also has the effect that the holder 3 in itself can dissipate heat to the environment, thus resulting in only a low thermal load on the servomotor 2.

To increase the stability of the holder 3 as a whole, the two holding brackets 7, 8 may each be equipped with additional narrow side brackets 19, 20 (indicated here by dashed lines), which should however not completely close off the sides of the space in which the coupling element 4 is situated in order that they do not unduly impair the dissipation of heat to the ambient air.

The holding brackets 7, 8 are screwed to one another in each case by way of one leg, whereas the other legs 21, are screwed to the throttle valve 1 and to the servomotor 2. Said legs 21, 22 may have an arrangement of the fastening holes as illustrated in FIG. 5 for the leg 22 of the holding bracket 8. In FIG. 5, the fastening holes 23 are oriented substantially along a diagonal of the leg 22 and are in the form of slots, the slot width of which increases with increasing radial distance from a central passage opening 24. The leg 22 is thus suitable for the fastening of servomotors with connection flanges of different sizes, if the fastening points of the respective servomotor are positioned correspondingly.

In FIG. 5, the passage opening 24 is designed to be relatively small, such that substantially the shaft 6 of the servomotor 2 illustrated in FIG. 1 and FIG. 2 can be guided through said opening. The passage opening 24 may however also, as shown in FIG. 1 and FIG. 2 and also FIG. 6, be designed to be large enough that the clamping element 4 can be guided through the passage opening 24 for assembly purposes.

Figure 6B:
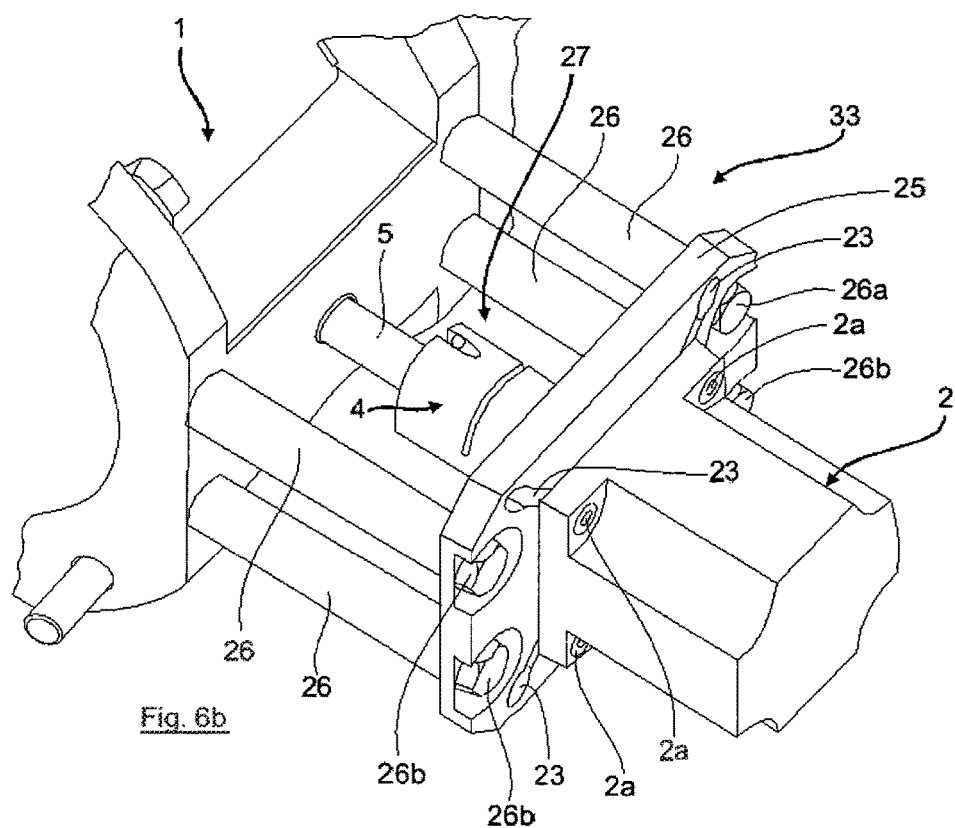
FIG. 6b shows an exemplary embodiment of the variant shown in FIG. 6a, in a perspective illustration.

FIGS. 6a and 6b shows a variant of a holder 33 for the fastening of the servomotor 2 in the region of the throttle valve 1, wherein FIG. 6a shows a schematic diagrammatic sketch, and FIG. 6b shows a perspective illustration, of an exemplary embodiment in this regard. The holder 33 illustrated here has a support plate 25 which is screwed (screws 26a in FIG. 6b) to the housing of the throttle valve 1 via spacer sleeves 26 or through said spacer sleeves. In the case of a rectangular or square support plate 25, it is possible, as schematically illustrated in FIG. 6b, for spacer sleeves 26 to be arranged in each of the corner regions, such that overall, an open receiving space 27 is generated for the clamping element 4, which receiving space ensures very good dissipation of heat from the clamping element 4 to the ambient air. Furthermore, heat conduction to the support plate 25 and thus to the servomotor 2 takes place only to a small extent via the spacer sleeves 26. Such a construction with multiple spacer sleeves 26 arranged in the corner regions is altogether relatively stable, in particular also with regard to the natural frequencies arising in this region.

As can also be gathered very clearly from FIG. 6b, it is the case here—analogously to the holding bracket 8 of the preceding embodiment—that the support plate 25 forms a holding element of the holder 33, in which holding element the fastening holes 23 for the fastening screws 2a that engage therein are again formed in the manner of elongated holes or slots.

Instead of a sleeve-shaped coupling element, FIG. 7 shows a coupling between the two shafts 5, 6, which in this case are arranged offset with respect one another, via a linkage 28 composed of two actuating rods 29, 30 and a coupling rod 31. Here, the shaft 6 again constitutes the drive shaft of the servomotor 2, which, when it performs a rotational movement in arrow direction 32, causes, via the linkage 28, a rotation of the shaft 5 of the throttle valve in arrow direction 34. A spring element 35, in the form of a tension spring, which engages on the actuating rod 29 of the shaft 5 exerts a return force on the shaft 5 via the actuating rod 29 when the servomotor 2 rotates its shaft 6 in arrow direction 32.

The linkage 28 may be composed of a material of low thermal conductivity. Even in the event of the linkage 28 being formed from metal, an embodiment of a coupling element is obtained which permits only very low heat transfer via the parts that are mechanically coupled to one another.

Figure 9:
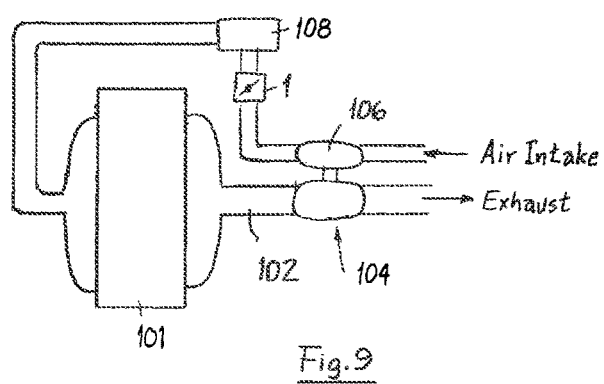
FIG. 9 shows a schematic diagram of an internal combustion engine including the throttle valve and the device for actuating the throttle valve according to an embodiment of the invention.

FIG. 8 shows an embodiment in which the coupling element 4 includes a cardan foist, FIG. 9 is a schematic diagram of an internal combustion engine 101 having an exhaust 102 connected to a turbo charger 104. A compressor 106 of the turbocharger 104 is arranged in an intake air system 105. The throttle valve 1 with the above-described apparatus for actuating the throttle valve is arranged downstream of the compressor 106 and upstream of a charge-air cooler 108 of the intake air system 105. The throttle valve includes a throttle flap controlling air flow in the intake air system 105.

The invention claimed is:

1. An apparatus for the actuation of a throttle valve arranged in an intake system of an internal combustion engine, comprising:
    a servomotor having a servomotor shaft;
    at least one device for thermal decoupling arranged between the throttle valve and the servomotor, wherein the device for thermal decoupling comprises a torque-transmitting coupling element coupling the shaft of the servomotor to a throttle valve shaft of the throttle valve, wherein the coupling element has a definedly low heat transfer capability,
    wherein the coupling element is connected to one of the servomotor shaft and the throttle valve shaft so that the coupling element and the one of the servomotor shaft and the throttle valve shaft are fixedly connected with respect to rotation and axially movable relative to each other; and
    a mount comprising two L-shaped angle brackets, each of the L-shaped angle brackets having a base and a leg, the bases of the L-shaped angle brackets being connected using threaded connecting elements to form a U-shaped motor support with one of the legs connected to the throttle valve and the other of the legs connected to the servomotor, wherein a distance between the legs is adjustable within a predefined setting range.

2. The apparatus according to claim 1, wherein the coupling element has a lower heat transfer capability than at least one of the servomotor shaft and the throttle valve shaft.

3. The apparatus according to claim 1, wherein the holder mount is open at least on one side, and the coupling element is situated in the holder mount.

4. The apparatus according to claim 3, wherein the holder mount has fastening holes on a side facing toward the servomotor, said fastening holes being designed for the fastening of servomotors with connection flanges of different sizes.

5. The apparatus according to claim 4, wherein the fastening holes are slot-shaped fastening holes.

6. The apparatus according to claim 1, wherein the coupling element is composed at least partially of at least one of ceramic, plastic, or some other material of low thermal conductivity.

7. The apparatus according to claim 1, wherein the coupling element is coupled to one of the throttle valve shaft and the servomotor shaft by linear or punctiform contact surfaces.

8. The apparatus according to claim 1, wherein the coupling element comprises a linkage between the throttle valve shaft and the servomotor shaft.

9. The apparatus according to claim 1, wherein the coupling element is a sleeve having a first side connected to the one of the servomotor shaft and the throttle valve shaft, and a second side connected to the other one of the servomotor shaft and the throttle valve shaft by a clamped connection.

10. The apparatus according to claim 9, wherein the clamped connection of the sleeve-shaped coupling element is effected by a slotted and thus radially adjustable clamping region.

11. The apparatus according to claim 10, wherein the clamping region can be braced by a clamping screw.

12. The apparatus according to claim 9, wherein the coupling element has, on the first side, a receiving opening with a larger diameter than the one of the servomotor shaft and the throttle valve shaft inserted therein, and wherein the one of the servomotor shaft and the throttle valve shaft is connected to the coupling element by way of a transverse pin in one of a longitudinal slot and a longitudinal groove on the coupling element.

13. The apparatus according to claim 3, wherein the mount has a passage opening for the shaft of the servomotor, the opening diameter of the passage opening is dimensioned such that the coupling element can be guided through the passage opening.

14. An internal combustion engine for a motor vehicle or in the form of a static engine, having an intake system through which a hot medium stream flows, wherein an apparatus according to claim 1 is arranged in or on the intake system.

15. The internal combustion engine according to claim 14 wherein the valve is a throttle flap is arranged downstream of a compressor of an exhaust-gas turbocharger of the internal combustion engine and upstream of a charge-air cooler of the intake system.

16. The apparatus according to claim 1, wherein the coupling element is a sleeve having a first side connected to the one of the servomotor shaft and the throttle valve shaft, wherein the one of the servomotor shaft and the throttle valve shaft is connected to the coupling element by way of a transverse pin in one of a longitudinal slot and a longitudinal groove at the first side of the sleeve, the one of the longitudinal slot and the longitudinal groove being open on the first side of the sleeve, such that the transverse pin can be inserted into the one of the longitudinal slot and the longitudinal groove in a longitudinal direction.

17. The apparatus according to claim 1, wherein the mount is open on three sides in an intermediate space between the throttle valve and the servomotor.

* * * * *